(12) United States Patent
Smith et al.

(10) Patent No.: US 11,621,583 B2
(45) Date of Patent: Apr. 4, 2023

(54) DISTRIBUTED CONTROL ADAPTIVE WIRELESS POWER TRANSFER SYSTEM

(71) Applicant: University of Washington, Seattle, WA (US)

(72) Inventors: Joshua R. Smith, Seattle, WA (US); Benjamin Waters, Seattle, WA (US)

(73) Assignee: University of Washington, Seattle, WA (US)

( * ) Notice: Subject to any disclaimer, the term of this patent is extended or adjusted under 35 U.S.C. 154(b) by 0 days.

(21) Appl. No.: 17/461,885

(22) Filed: Aug. 30, 2021

(65) Prior Publication Data

US 2021/0391754 A1 Dec. 16, 2021

Related U.S. Application Data

(63) Continuation of application No. 16/401,012, filed on May 1, 2019, now abandoned, which is a continuation
(Continued)

(51) Int. Cl.
*H02J 50/10* (2016.01)
*H02J 50/80* (2016.01)
(Continued)

(52) U.S. Cl.
CPC ............ *H02J 50/10* (2016.02); *H02J 7/025* (2013.01); *H02J 50/12* (2016.02); *H02J 50/80* (2016.02); *H04B 5/0037* (2013.01)

(58) Field of Classification Search
CPC .. H02J 50/10; H02J 7/025; H02J 50/12; H02J 50/80; H04B 5/0037
(Continued)

(56) References Cited

U.S. PATENT DOCUMENTS

| 3,553,736 A | 1/1971 | Kantrowitz et al. |
| 4,809,681 A | 3/1989 | Kantrowitz et al. |

(Continued)

FOREIGN PATENT DOCUMENTS

| AU | 2007349874 A2 | 6/2007 |
| AU | 2009246310 A1 | 11/2009 |

(Continued)

OTHER PUBLICATIONS

Extended European Search Report dated Jul. 26, 2017, issued in related European Application No. EP17173137.5.
(Continued)

*Primary Examiner* — Toan T Vu
*Assistant Examiner* — Thai H Tran
(74) *Attorney, Agent, or Firm* — COJK/University of Washington

(57) ABSTRACT

A wireless power transfer system includes a transmitter configured to transmit power to a receiver, for example, through coupled resonators. The transmitter receives feedback from the receiver, and uses the feedback to control the power transmission, to control a parameter at the receiver, for example, a rectified voltage output by the receiver. The feedback to the transmitter may be provided, for example, by an out-of-band radio system between the transmitter and receiver, by a reflection coefficient at the transmitter, and/or by an encoded modulation of power in the receiver, for example, in an impedance matching module. The transmitter may control the transmitted power, for example, by controlling a transmitter signal generator voltage ($V_{SIG}$), a transmitter gate driver voltage ($V_{GD}$), a transmitter amplifier voltage ($V_{PA}$), and/or an impedance setting in a transmitter impedance matching module.

13 Claims, 9 Drawing Sheets

Related U.S. Application Data of application No. 15/503,711, filed as application No. PCT/US2015/042941 on Jul. 30, 2015, now abandoned, and a continuation-in-part of application No. 14/402,660, filed as application No. PCT/US2013/042085 on May 21, 2013, now abandoned, which is a continuation of application No. 13/843,884, filed on Mar. 15, 2013, now Pat. No. 8,827,889.

(60) Provisional application No. 62/031,131, filed on Jul. 30, 2014, provisional application No. 61/734,236, filed on Dec. 6, 2012, provisional application No. 61/691,127, filed on Aug. 20, 2012, provisional application No. 61/649,496, filed on May 21, 2012.

(51) Int. Cl.
*H04B 5/00* (2006.01)
*H02J 7/02* (2016.01)
*H02J 50/12* (2016.01)

(58) Field of Classification Search
USPC .......................................... 307/104; 320/108
See application file for complete search history.

(56) References Cited

U.S. PATENT DOCUMENTS

| | | | |
|---|---|---|---|
| 5,290,227 A | 3/1994 | Pasque | |
| 5,630,836 A | 5/1997 | Prem et al. | |
| 5,980,448 A | 11/1999 | Heilman et al. | |
| 6,331,744 B1 | 12/2001 | Chen et al. | |
| 6,445,956 B1 | 9/2002 | Laird et al. | |
| 6,669,624 B2 | 12/2003 | Frazier | |
| 6,764,373 B1 | 7/2004 | Osawa et al. | |
| 6,894,456 B2 | 5/2005 | Tsukamoto et al. | |
| 7,616,997 B2 | 11/2009 | Kieval et al. | |
| 7,741,734 B2 | 6/2010 | Joannopoulos et al. | |
| 7,825,543 B2 | 11/2010 | Karalis et al. | |
| D636,333 S | 4/2011 | Kulikowski | |
| 7,986,122 B2 | 7/2011 | Fornage et al. | |
| 8,022,576 B2 | 9/2011 | Joannopoulos et al. | |
| 8,035,255 B2 | 10/2011 | Kurs et al. | |
| 8,076,800 B2 | 12/2011 | Joannopoulos et al. | |
| 8,076,801 B2 | 12/2011 | Karalis et al. | |
| 8,084,889 B2 | 12/2011 | Joannopoulos et al. | |
| 8,097,983 B2 | 1/2012 | Karalis et al. | |
| 8,143,746 B2 | 3/2012 | Marzetta et al. | |
| 8,299,652 B2 | 10/2012 | Sample et al. | |
| 8,446,045 B2 | 5/2013 | Smith et al. | |
| 8,551,163 B2 | 10/2013 | Aber et al. | |
| 8,618,766 B2 | 12/2013 | Anderson et al. | |
| 8,767,871 B2 | 7/2014 | Park et al. | |
| 8,829,889 B2 | 9/2014 | Smith et al. | |
| 8,864,644 B2 | 10/2014 | Yomtov | |
| 9,415,149 B2 | 8/2016 | Smith et al. | |
| 2003/0032853 A1 | 2/2003 | Korakianitis et al. | |
| 2003/0214821 A1* | 11/2003 | Giannopoulos | H02J 50/12 363/21.02 |
| 2004/0116769 A1 | 6/2004 | Jassawalla et al. | |
| 2004/0172077 A1 | 9/2004 | Chinchoy et al. | |
| 2005/0085683 A1 | 4/2005 | Bolling et al. | |
| 2007/0060787 A1 | 3/2007 | Peters et al. | |
| 2008/0143192 A1 | 6/2008 | Sample et al. | |
| 2008/0183287 A1 | 7/2008 | Ayre | |
| 2008/0211320 A1 | 9/2008 | Cook et al. | |
| 2008/0278264 A1 | 11/2008 | Karalis et al. | |
| 2009/0046030 A1 | 2/2009 | Song et al. | |
| 2009/0134712 A1 | 5/2009 | Cook et al. | |
| 2010/0030304 A1 | 2/2010 | Haubrich et al. | |
| 2010/0045114 A1 | 2/2010 | Sample | |
| 2010/0052811 A1 | 3/2010 | Smith et al. | |
| 2010/0063347 A1 | 3/2010 | Yomtov et al. | |
| 2010/0081379 A1 | 4/2010 | Cooper et al. | |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0141042 A1 | 6/2010 | Kesler et al. | |
| 2010/0148589 A1 | 6/2010 | Hamam et al. | |
| 2010/0164296 A1 | 7/2010 | Kurs et al. | |
| 2010/0164297 A1 | 7/2010 | Kurs et al. | |
| 2010/0164298 A1 | 7/2010 | Karalis et al. | |
| 2010/0171368 A1 | 7/2010 | Schatz et al. | |
| 2010/0171370 A1 | 7/2010 | Karalis et al. | |
| 2010/0181843 A1 | 7/2010 | Schatz et al. | |
| 2010/0181844 A1 | 7/2010 | Karalis et al. | |
| 2010/0181845 A1 | 7/2010 | Fiorello et al. | |
| 2010/0182216 A1 | 7/2010 | Schmidhammer | |
| 2010/0187911 A1 | 7/2010 | Joannopoulos et al. | |
| 2010/0187913 A1 | 7/2010 | Smith et al. | |
| 2010/0191036 A1 | 7/2010 | Sullivan | |
| 2010/0201203 A1 | 8/2010 | Schatz et al. | |
| 2010/0201205 A1 | 8/2010 | Karalis et al. | |
| 2010/0207458 A1 | 8/2010 | Joannopoulos et al. | |
| 2010/0217553 A1* | 8/2010 | Von Novak | H04B 5/0056 702/65 |
| 2010/0219694 A1 | 9/2010 | Kurs et al. | |
| 2010/0225175 A1 | 9/2010 | Karalis et al. | |
| 2010/0231053 A1 | 9/2010 | Karalis et al. | |
| 2010/0231340 A1 | 9/2010 | Fiorello et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0237709 A1 | 9/2010 | Hall et al. | |
| 2010/0253152 A1 | 10/2010 | Karalis et al. | |
| 2010/0259108 A1 | 10/2010 | Giler et al. | |
| 2010/0259110 A1 | 10/2010 | Kurs et al. | |
| 2010/0264745 A1 | 10/2010 | Hall et al. | |
| 2010/0277003 A1 | 11/2010 | Von Novak et al. | |
| 2010/0277005 A1 | 11/2010 | Karalis et al. | |
| 2010/0277121 A1 | 11/2010 | Hall et al. | |
| 2010/0308939 A1 | 12/2010 | Kurs | |
| 2010/0327660 A1 | 12/2010 | Karalis et al. | |
| 2010/0327661 A1 | 12/2010 | Karalis et al. | |
| 2011/0012431 A1 | 1/2011 | Karalis et al. | |
| 2011/0018361 A1 | 1/2011 | Karalis et al. | |
| 2011/0043046 A1 | 2/2011 | Joannopoulos et al. | |
| 2011/0043047 A1 | 2/2011 | Karalis et al. | |
| 2011/0043048 A1 | 2/2011 | Karalis et al. | |
| 2011/0043049 A1 | 2/2011 | Karalis et al. | |
| 2011/0049998 A1 | 3/2011 | Karalis et al. | |
| 2011/0053500 A1 | 3/2011 | Menegoli | |
| 2011/0074218 A1 | 3/2011 | Karalis et al. | |
| 2011/0074346 A1 | 3/2011 | Hall et al. | |
| 2011/0074347 A1 | 3/2011 | Karalis et al. | |
| 2011/0089895 A1 | 4/2011 | Karalis et al. | |
| 2011/0095618 A1 | 4/2011 | Schatz et al. | |
| 2011/0121920 A1 | 5/2011 | Kurs et al. | |
| 2011/0140544 A1 | 6/2011 | Karalis et al. | |
| 2011/0156493 A1 | 6/2011 | Bennett | |
| 2011/0162895 A1 | 7/2011 | Karalis et al. | |
| 2011/0169337 A1 | 7/2011 | Kozakai | |
| 2011/0169339 A1 | 8/2011 | Campanella et al. | |
| 2011/0193419 A1 | 8/2011 | Karalis et al. | |
| 2011/0198939 A1 | 8/2011 | Karalis et al. | |
| 2011/0201870 A1 | 8/2011 | Forsell | |
| 2011/0221278 A1 | 9/2011 | Karalis et al. | |
| 2011/0241440 A1 | 10/2011 | Sakoda et al. | |
| 2011/0304408 A1 | 12/2011 | McKinzie, III | |
| 2012/0007690 A1 | 1/2012 | van Bezooijen | |
| 2012/0049648 A1 | 3/2012 | Choi et al. | |
| 2012/0080957 A1 | 4/2012 | Cooper et al. | |

(56) References Cited

U.S. PATENT DOCUMENTS

| | | | |
|---|---|---|---|
| 2012/0153738 | A1 | 6/2012 | Karals et al. |
| 2012/0161536 | A1 | 6/2012 | Kamata et al. |
| 2012/0217926 | A1 | 8/2012 | Yoon et al. |
| 2012/0235636 | A1 | 9/2012 | Partovi |
| 2012/0243579 | A1 | 9/2012 | Premakanthan et al. |
| 2012/0248888 | A1 | 10/2012 | Kesler et al. |
| 2013/0278209 | A1 | 10/2013 | Von Novak, III et al. |
| 2013/0310630 | A1 | 11/2013 | Smith et al. |
| 2014/0015328 | A1 | 1/2014 | Beaver et al. |
| 2014/0070623 | A1 | 3/2014 | Keeling et al. |
| 2014/0073838 | A1 | 3/2014 | Dague et al. |
| 2014/0275727 | A1 | 9/2014 | Bonde et al. |
| 2015/0280444 | A1 | 10/2015 | Smith et al. |

FOREIGN PATENT DOCUMENTS

| | | |
|---|---|---|
| AU | 2010200044 A1 | 1/2010 |
| CA | 2 615 123 A1 | 1/2007 |
| CA | 2 682 284 A1 | 10/2008 |
| CA | 2 724 341 A1 | 11/2009 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| EP | 2 281 322 A1 | 2/2011 |
| EP | 2 306 615 A2 | 4/2011 |
| EP | 2 306 616 A2 | 4/2011 |
| EP | 2 340 611 A1 | 7/2011 |
| EP | 2 345 100 A1 | 7/2011 |
| JP | 2009-501510 A | 1/2009 |
| JP | 2011-177018 A | 9/2011 |
| JP | 2012-52602 A | 1/2012 |
| KR | 20080031398 A | 4/2008 |
| KR | 20100015954 A | 2/2010 |
| KR | 20110014649 A | 2/2011 |
| KR | 20110069182 A | 6/2011 |
| KR | 20110074761 A | 7/2011 |
| WO | 2007/00866 A2 | 1/2007 |
| WO | 2008/118178 A1 | 10/2008 |
| WO | 2009/140506 A1 | 11/2009 |
| WO | 2010-009399 | 1/2010 |
| WO | 201/036980 A1 | 4/2010 |
| WO | 2010/108191 A1 | 9/2010 |
| WO | 2011/146661 A2 | 11/2011 |
| WO | 2013/177205 A1 | 11/2013 |
| WO | 2016/019159 A1 | 2/2016 |

OTHER PUBLICATIONS

International Search Report and Written Opinion dated Oct. 23, 2015, issued in corresponding International Application No. PCT/US2015/42941, filed Jul. 30, 2015, 10 pages.

Ali, A.N.A., et al., "A Survey of Maximum PPT Techniques of PV Systems," Proceedings of the IEEE Energytech Conference, Cleveland, Ohio, May 29-31, 2012, pp. 1-17.

Amir, O., et al., "Peripheral Vascular Reactivity in Patients With Pulsatile vs Axial Flow Left Ventricular Assist Device Support," Journal of Heart and Lung Transplantation 25(4):391-394, Apr. 2006.

Ayre, P.J., et al., "Sensorless Flow and Head Estimation in the VentrAssist Rotary Blood Pump," Artificial Organs 24(8)1585-588, Aug. 2000.

Beh, T.C., et al., "Automated Impedance Matching System for Robust Wireless Power Transfer via Magnetic Resonance Coupling," IEEE Transactions on Industrial Electronics 60(9)13689-3698, Jun. 2012.

Beh, T.C., et al., "Wireless Power Transfer System via Magnetic Resonant Coupling at Fixed Resonance Frequency—Power Transfer System Based on Impedance Matching," World Electric Vehicle Journal 4:744-753, Nov. 2010.

Birks, E.J., et al., "Left Ventricular Assist Device and Drug Therapy for the Reversal of Heart Failure," New England Journal of Medicine 355(18):1873-1884, Nov. 2006.

Bishopric, N.H., "Evolution of the Heart From Bacteria to Man," Annals of the New York Academy of Sciences 1047:13-29, Jun. 2005.

Bonde, P., et al., "National Trends in Readmission (REA) Rates Following Left Ventricular Assist Device (LVAD) Therapy," Journal of Heart and Lung Transplantation 30(4 Suppl):S9, Apr. 2011.

Boston, J.R., et al., "Control Issues in Rotary Heart Assist Devices," Proceedings of the American Control Conference, Chicago, Jun. 28-30, 2000, pp. 3473-3477.

Choi, S., et al., "A Sensorless Approach to Control of a Turbodynamic Left Ventricular Assist System," IEEE Transactions on Control Systems Technology 9(3):473-482, May 2001.

Christ, A., et al., "The Virtual Family—Development of Surface-Based Anatomical Models of Two Adults and Two Children for Dosimetric Simulations," Physics in Medicine and Biology 55(2):N23-N38, Jan. 2010.

Akimoto, T., et al., "Rotary Blood Pump Flow Spontaneously Increases During Exercise Under Constant Pump Speed: Results of a Chronic Study," Artificial Organs 23(8):797-801, Aug. 1999.

Cowger, J., et al., "The Development of Aortic Insufficiency in Left Ventricular Assist Device-Supported Patients," Circulation: Heart Failure 3(6):668-674, Nov. 2010.

Crow, S., et al., "Gastrointestinal Bleeding Rates in Recipients of Nonpulsatile and Pulsatile Left Ventricular Assist Devices," Journal of Thoracic and Cardiovascular Surgery 137(1):208-215, Jan. 2009.

Demirozu, Z.T., et al., "Arteriovenous Malformation and Gastrointestinal Bleeding in Patients With the HeartMate II Left Ventricular Assist Device," Journal of Heart and Lung Transplantation 30(8):849-853, Aug. 2011.

Deyle, T., and M. Reynolds, "PowerPACK: A Wireless Power Distribution System for Wearable Devices," Proceedings of the 12th IEEE International Symposium on Wearable Computers, Pittsburgh, Pa., Sep. 28-Oct. 1, 2008, pp. 91-98.

Duong, T.P., and J.-W. Lee, "Experimental Results of High-Efficiency Resonant Coupling Wireless PowerTransfer Using a Variable Coupling Method," IEEE Microwave and Wireless Components Letters 21(8):442-444, Aug. 2011.

Fletcher, N.H., and T.D. Rossing, "Coupled Vibrating Systems," Chap. 4, in "The Physics of Musical Instruments," 2d. ed., Springer-Verlag: New York, 1998, pp. 102-132.

Giridharan, G.A., and M. Skliar, "Physiological Control of Blood Pumps Using Intrinsic Pump Parameters: A Computer Simulation Study," Artificial Organs 30(4):301-307, Apr. 2006.

Goldstein, D.J., et al., "Driveline Infections in LVADs: Is It the Pump or the Patient?" Journal of Heart and Lung Transplantation 30(4 Suppl):S10, Apr. 2011.

Heidenreich, P.A., et al., "Forecasting the Impact of Heart Failure in the United States: A Policy Statement From the American Heart Association," Circulation: Heart Failure 6(3):606-619, May 2013.

Karantonis, D.M., et al., "Noninvasive Pulsatile Flow Estimation for an Implantable Rotary Blood Pump," Proceedings of the 29th Annual International Conference of the IEEE Engineering in Medicine and Biology Society (EMBS 2007), Lyon, France, Aug. 23-26, 2007, pp. 1018-1021.

Kiani, M., and M. Ghovanloo, "The Circuit Theory Behind Coupled-Mode Magnetic Resonance-Based Wireless Power Transmission," IEEE Transactions on Circuits and Systems I: Regular Papers 59(9):2065-2074, Sep. 2012.

Kiani, M., et al., "Design and Optimization of a 3-Coil Inductive Link for Efficient Wireless Power Transmission," IEEE Transactions on Biomedical Circuits and Systems 5(6):579-591, Dec. 2011.

Li, Y.Y., et al., "Downregulation of Matrix Metalloproteinases and Reduction in Collagen Damage in the Failing Human Heart After Support With Left Ventricular Assist Devices," Circulation 104(10):1147-1152, Sep. 2001.

Paing, T., et al., "Resistor Emulation Approach to Low-Power RF Energy Harvesting," IEEE Transactions on Power Electronics 23(3):1494-1501, May 2008.

(56) References Cited

OTHER PUBLICATIONS

Parnis, S.M., et al., "Progress in the Development of a Transcutaneously Powered Axial Flow Blood Pump Ventricular Assist System," ASAIO Journal 43(5):M576-M580, Sep.-Oct. 1997.

Pirbodaghi, T., et al., "Asymmetric Speed Modulation of a Rotary Blood Pump Affects Ventricular Unloading," European Journal of Cardio-Thoracic Surgery 43(2):383-388, Feb. 2013.

Pirbodaghi, T., et al., "Physiologic and Hematologic Concerns of Rotary Blood Pumps: What Needs to Be Improved?" Heart Failure Reviews 19(2):259-266, Mar. 2014.

PowerMat Technologies, "Powermat Wireless Charging System," Nov. 2011, <https://web.archive.org.web/20111115041555/http://www.powermat.com> [retrieved Mar. 2017], 1 page.

Pozar, D.M., "4.4: The Transmission (ABCD) Matrix," in "Microwave Engineering," 4th ed., John Wiley & Sons, Hoboken, N.J., 2012, pp. 188-194.

Ramrakhyani, A.K., et al., "Design and Optimization of Resonance-Based Efficient Wireless Power Delivery Systems for Biomedical Implants," IEEE Transactions on Biomedical Circuits and Systems 5(1):48-63, Feb. 2011.

Roger, V.L., et al., "Heart Disease and Stroke Statistics—2012 Update: A Report From the American Heart Association," Circulation 125(1):e2-e220, Jan. 2012.

Rose, E.A., et al., "Long-Term Use of a Left Ventricular Assist Device for End-Stage Heart Failure," New England Journal of Medicine 345(20):1435-1443, Nov. 2001.

Si, P., et al., "A Frequency Control Method for Regulating Wireless Power to Implantable Devices," IEEE Transactions an Biomedical Circuits and Systems 2(1):22-29, Mar. 2008.

Simon, D., et al., "Left Ventricular Assist Device-Related Infection: Treatment and Outcome," Clinical Infectious Diseases 40(8): 1108-1115, Apr. 2005.

Sivaratnam, K., and J.M. Duggan, "Left Ventricular Assist Device Infections: Three Case Reports and a Review of the Literature," ASAIO Journal 48(1):2-7, Jan.-Feb. 2002.

Slaughter, M.S., et al., "Advanced Heart Failure Treated With Continuous-Flow Left Ventricular Assist Device," New England Journal of Medicine 361(23):2241-2251, Dec. 2009.

Stehlik, J., et al., "The Registry of the International Society for Heart and Lung Transplantation: Twenty-Seventh Official Adult Heart Transplant Report—2010," Journal of Heart and Lung Transplantation 29(10):1089-1103, Oct. 2010.

Thoratec Corporation, "HeartMate II® LVAS: Left Ventricular Assist System," Operating Manual, Document No. 103538, Rev. B, Nov. 2007, 157 pages.

Tsukiya, T., et al., "Use of Motor Current in Flow Rate Measurement for the Magnetically Suspended Centrifugal Blood Pump," Artificial Organs 21(5):396-401, May 1997.

Waters, T., et al., "Motor Feedback Physiological Control for a Continuous Flow Ventricular Assist Device," Artificial Organs 23(6):480-486, Jun. 1999.

Westaby, S., et al., "Circulatory Support With Attenuated Pulse Pressure Alters Human Aortic Wall Morphology," Journal of Thoracic and Cardiovascular Surgery 133(2):575-576, Feb. 2007.

Yeager, D.J., et al., "Chapter 14—WISP: A Passively Powered UHF RFID Tag With Sensing and Computation," in Ahson and Ilyas (eds.), "RFID Handbook: Applications, Technology, Security, and Privacy," CRC Press, Boca Raton, Florida, 2008, pp. 261-276.

Yoshizawa, M., et al., "Sensorless Estimation of Pressure Head and Flow of a Continuous Flow Artificial Heart Based on Input Power and Rotational Speed," ASAIO Journal 48(4):443-448, Jul.-Aug. 2002.

Allen, J.G., et al., "Quality of Life and Functional Status in Patients Surviving 12 Months After Left Ventricular Assist Device Implantation," Journal of Heart and Lung Transplanation 29(3):279-285, Mar. 2010.

Brown, W.C., "The History of Power Transmission by Radio Waves," IEEE Transactions on Microwave Theory and Techniques 32(9):1230-1242, Sep. 1984.

Cannon, B.L., et al., "Magnetic Resonant Coupling as a Potential Means for Wireless Power Transfer to Multiple Small Receivers," IEEE Transactions on Power Electronics 24(7):1819-1825, Jul. 2009.

Casanova, J.J., et al., "A Loosely Coupled Planar Wireless Power System for Multiple Receivers," IEEE Transactions on Individual Electronics 56(8):3060-3068, Aug. 2009.

Christ, A., et al., "Numerical Electromagnetic Analysis of Human Exposure for Wireless Power Transfer Systems," Proceedings of the Tenth International Congress of the European Bioelectromagnetics Association (EBEA), Rome, Feb. 21-24, 2011, 2 pages.

Deng, M., et al., "Mechanical Circulatory Support Device Database of the International Society for Heart and Lung Transplantation: First Annual Report—2003," Journal of Heart and Lung Transplantation 22(6):653-662, Jun. 2003.

El-Banayosy, A., et al., "Preliminary Experience With the LionHeart Left Ventricular Assist Device in Patients With End-Stage Heart Failure," Annals of Thoracic Surgery 75(5):1469-1475, May 2003.

Extended European Search Report dated Jan. 5, 2016, issued in corresponding European Application Mo. EP13793259, filed May 21, 2013, 6 pages.

Frickey, D.A., "Conversions Between S, Z, Y, H, ABCD, and T Parameters Which are Valid for Complex Source and Load Impedances," IEEE Transactions on Microwave Theory and Techniques 42(2):205-211, Feb. 1994.

Gordon, R.J., et al., "Ventricular Assist Device-Related Infections," Lancet: Infectious Diseases 6(7):426-437, Jul. 2006.

Holman, W.L., et al., "Device Related Infections: Are We Making Progress?" Journal of Cardiac Surgery 25(4):478-483, Jul. 2010.

International Search Report and Written Opinion dated Aug. 26, 2013, issued in corresponding International Application No. PCT/US2013/042085, filed May 21, 2013, 9 pages.

Kim, N.Y., et al., "Adaptive Frequency With Power-Level Tracking System for Efficient Magnetic Resonance Wireless Power Transfer," Electronics Letters 48(8):1-2, Apr. 2012.

Kurs, A., et al., "Wireless Power Transfer via Strongly Coupled Magnetic Resonances," Science 317(5834):83-86, Jul. 2007.

Low, Z.N., et al., "Design and Test of a High-Power High-Efficiency Loosely Coupled Planar Wireless Power Transfer System," IEEE Transactions on Industrial Electronics 56(5):1801-1812, May 2009.

Martin, S.I., et al., "Effect of Body Mass Index and Device Type of Infection in Left Ventricular Assist Device Support Beyond 30 Days," Interactive Cardiovascular and Thoracic Surgery 11(1):20-30, Jul. 2010.

McSpadden, J.O., et al., "Space Solar Power Programs and Microwave Wireless Power Transmission Technology," IEEE Microwave Magazine 3(4):4-57, Dec. 2002.

Miller, L.W., et al., "Use of a Continuous-Flow Device in Patients Awaiting Heart Transplantation," New England Journal of Medicine 357(9):885-896, Aug. 2007.

Mizannojehdehi, A.,et al, "Design and Analysis of a Class-E Frequency-Controlled Transcutaneous Energy Transfer System," Proceedings of the 13th IEEE International Conference on Electronics, Circuits and Systems, Nice, France, Dec. 10-13, 2006, pp. 21-24.

Monkowski, D.H., et al., "Infections Associated With Ventricular Assist Devices: Epidemiology and Effect on Prognosis After Transplantation," Transplant Infectious Disease 9(2):114-120, Jun. 2007.

Ozeki, T., et al., "Functions for Detecting Malposition of Transcutaneous Energy Transmission Coils," ASAIO Journal 49:469-474, Jul. 2003.

Pagani, F.D., et al., "Extended Mechanical Circulatory Support With a Continuous-Flow Rotary Left Ventricular Assist Device," Journal of the American College of Cardiology 54(4):312-321, Jul. 2009.

Park, J., et al., "Investigation of Adaptive Matching Methods for Near-Field Wireless Power Transfer," IEEE Transactions on Antennas and Propagation 59(5):1769-1773, May 2011.

Park, J.H., et al., "Optimum Frequency of High Q-Factor Resonator for Magnetic Resonance Coupling," Proceedings of the 41st European Microwave Conference (EuMC), Manchester, U.K., Oct. 10-13, 2011, pp. 61-63.

(56) References Cited

OTHER PUBLICATIONS

Raval, P., et al., "A Wireless Power Transfer System for Low Power Electronics Charging Applications," Proceedings of the Sixth IEEE Conference on Industrial Electronics and Applications (ICIEA), Beijing, Jun. 21-23, 2011, pp. 520-525.

Raymond, A.L., et al., "Obesity and Left Ventricular Assist Device Driveline Exit Site Infection," ASAIO Journal 56(1):57-60, Jan.-Feb. 2010.

Sample, A.P., et al., "Analysis, Experimental Results, and Range Adaptation of Magnetically Coupled Resonators for Wireless Power Transfer," IEEE Transactions on Industrial Electronics 58(2):544-554, Feb. 2011.

Sample, A.P.,et al, "Enabling Seamless Wireless Power Delivery in Dynamic Environments," Proceedings of the IEEE 101(6):1343-1358, Jun. 2013.

Sample, A., et al., "Experimental Results With two Wireless Power Transfer Systems," Proceedings of the IEEE Radio and Wireless Symposium, San Diego, Jan. 18-22, 2009, pp. 16-18.

Smith et al., "Innovative Free-Range Resonant Electrical Energy Delivery System (Free-D System) for a Ventricular Assist Device Using Wireless Power," ASAIO Journal 60(1):31-37, Jan.-Feb. 2014 (Abstract only).

Sun, Y., et al., "Design Method for Impedance Matching Networks," IEEE Proceedings—Circuits, Devices and Systems 143(4):186-194, Aug. 1996.

Thompson, M., and J.K. Fidler, "Determination of the Impedance Matching Domain of Impedance Matching Networks," IEEE Transactions on Circuits and Systems—I: Regular Papers 51(10):2098-2106, Oct. 2004.

Topkara, V.K., et al., "Infectious Complications in Patients With Left Ventricular Assist Device: Etiology and Outcomes in the Continuous-Flow Era," Annals of Thoracic Surgery 90(4):1270-1277, Oct. 2010.

Waters, B.H., et al., "Adaptive Impedance Matching for Magnetically Coupled Resonators," Proceedings of the Progress in Electromagnetics Research Symposium (PIERS), Moscow, Aug. 19-23, 2012, pp. 694-701.

Waters, B.H., et al., "Powering a Ventricular Assist Device (VAD) With the Free-Range Resonant Electrical Energy Delivery (Free-D) System," Proceedings of the IEEE 100(1):138-149, Jan. 2012.

Wilson, W., et al., "Prevention of Infective Endocarditis: Guidelines From the American Heart Association," JADA 139:3S-24S, 2008.

Zierer, A., et al., "Late-Onset Driveline Infections: The Achilles' Heel of Prolonged Left Ventricular Assist Device Support," Annals of Thoracic Surgery 84(2):515-521, Aug. 2007.

Baddour, L.M., et al., "Nonvalvular Cardiovascular Device-Related Infections," Circulation 108(16):2015-2031, Oct. 2003.

Christ, A., et al., "Evaluation of Wireless Resonant Power Transfer Systems With Human Electromagnetic Exposure Limits," IEEE Transactions on Electromagnetic Compatibility 55(2):265-274, Apr. 2013.

Economist, "Technology Monitor: A Wireless Heart," Apr. 12, 2011, <http://www.economist.com/node'21017837/print> [retrieved Jan. 22, 2015], 3 pages.

Ford, O., "Analysts See HeartWare Taking Lead in LVAD Market Position," Medical Device Daily Midday Report, Feb. 1, 2011, <http://www.medicaldevicedaily.com/servlet/com.accumedia.web.Dispatch . . . > [retrieved Jan. 22, 2015], 2 pages.

Hollister, S., "From Touchstone to Flashpoint: The Wireless Charging Standards War," The Verge, <http://www.theverge.com/2013/4/17/4236980/wireless-charging> [retrieved Jan. 26, 2015], 22 pages.

Holman, W.I., et al., "Infection in Permanent Circulatory Support: Experience From the REMATCH Trial," Journal of Heart and Lung Transplantation 23(12):1359-1365, Dec. 2004.

Holman, W.L., et al., "Predictors of Death and Transplant in Patients With a Mechanical Circulatory Support Device a Multi-institutional Study," Journal of Heart and Lung Transplantation 28(1):44-50, Jan. 2009.

Huang, G.T., "Intel Labs Seattle Shows Off New Sensing Interfaces, Self-Charging Robot, Wireless Power," Xconomy, Sep. 29, 2009, <http://www.xconomy.com/seattle/2009/09/29/intel-labs-seatlle-shows-off . . . > [retrieved Jan. 26, 2015], 2 pages.

Moskowitz, A.J., et al., "The Cost of Long-Term LVAD Implantation," Annals of Thoracic Surgery 71(3, Suppl 1):S195-S198, Mar. 2001.

Oz, M.C., et al., "Left Ventricular Assist Devices as Permanent Heart Failure Therapy: The Price of Progress," Annals of Surgery 238(4):577-585, Oct. 2003.

Philipose, M., et al., "Battery-Free Wireless Identification and Sensing," Pervasive Computing 37-45, Jan.-Mar. 2005, 9 pages.

"Robotics: Technologies and Global Markets," BCC Research, Feb. 2013, <http://www.bccresearch.com'market-research/engineering/robotics-market . . . > [retrieved Jan. 26, 2015], 2 pages.

Schaffer, J.M., et al., "Infectious Complications After Pulsatile-Flow and Continuous-Flow Left Ventricular Assist Device Implantation," Journal of Heart and Lung Transplantation 30(2):164 174, Feb. 2011.

Schocken, D.D., et al., "Prevention of Heart Failure: A Scientific Statement From the American Heart Association Councils on Epidemiology and Prevention, Clinical Cardiology, Cardiovascular Nursing, and High Blood Pressure Research; Quality of Care and Outcomes Research Interdisciplinary Working Group; and Functional Genomics and Translational Biology Interdisciplinary Working Group," Circulation 117(19):2544-2565, May 2008.

Siegenthaler, M.P., et al., "The Jarvik 2000 is Associated With Less Infections Than the HeartMate Left Ventricular Assist Device," European Journal of Cardio-Thoracic Surgery 23(5):748-755, May 2003.

Slaughter, M.S., and T.J. Myers, "Transcutaneous Energy Transmission for Mechanical Circulatory Support Systems: History, Current Status, and Future Prospects," Journal of Cardiac Surgery 25(4):484-489, Jul. 2010.

Thoratec Corporation, Form 10-K, United States Securities and Exchange Commission, Washington, D.C., Annual Report Under Section 13 or 15(D) of the Securities Exchange Act of 1934, Fiscal Year ended Jan. 1, 2011, 108 pages.

Van Der Zee, B and A. Vaughan, "Nissan's Plug-Free Electric Car," The Guardian, Jul. 20, 2009, <http://www.theguardian.com/business/2009/jul20/nissan-electric-car-plug . . . > [retrieved Jan. 22, 2015], 2 pages.

"Ventricular Assist Device," Wikipedia, the free encyclopedia, Jan. 1, 2015, <http://en.wikipedia.org/wiki'Ventricular_assist_device> [retrieved Jan. 22, 2015], 16 pages.

Waters, B.H., et al., "Innovative Free-Range Resonant Electrical Energy Delivery System (FREE-D System) for a Ventricular Assist Device Using Wireless Power," ASAIO Journal 60(1):31-37, Jan.-Feb. 2014.

Weingartner, M., "Wireless Power-Wireless Resonant Energy Link (WREL)," Intel, Jul. 1, 2010, <http://newsroom.intel.com/docs/DOC-1119> [retrieved Jan. 22, 2015], 2 pages.

\* cited by examiner

DISTRIBUTED CONTROL ADAPTIVE WIRELESS POWER TRANSFER SYSTEM

CROSS-REFERENCES TO RELATED APPLICATIONS

This application is a continuation of U.S. patent application Ser. No. 16/401,012, filed May 1, 2019, which is a continuation of U.S. patent application Ser. No. 15/503,711, filed Feb. 13, 2017, which is the U.S. National Stage of International Application No. PCT/US2015/042941, filed Jul. 30, 2015, which claims the benefit of U.S. Provisional Application No. 62/031,131, filed Jul. 30, 2014. U.S. patent application Ser. No. 15/503,711 is also a continuation-in-part of U.S. patent application Ser. No. 14/402,660, filed Nov. 20, 2014, which is the U.S. National Stage of International Application No. PCT/US2013/042085, filed May 21, 2013, which is a continuation of U.S. application Ser. No. 13/843,884, filed Mar. 15, 2013, now U.S. Pat. No. 8,827,889, which claims the benefit of U.S. Provisional Application No. 61/649,496, filed May 21, 2012; U.S. Provisional Application No. 61/691,127 filed Aug. 20, 2012; and U.S. Provisional Application No. 61/734,236, filed Dec. 6, 2012. The entire disclosures of said applications are hereby incorporated by reference.

STATEMENT OF GOVERNMENT LICENSE RIGHTS

This invention was made with government support under grant No. 1R21 HL118611-01 awarded by the National Institutes of Health and grant No. EEC-1028725 awarded by the National Science Foundation. The government has certain rights in the invention.

BACKGROUND

Wireless power transfer using inductive coupling is becoming increasingly popular for consumer electronic devices. Commercial applications include wireless charging pads, electronic toothbrushes, induction cookers, and electric car battery chargers. However, none of these applications enable the range or geometric freedom that the term wireless power suggests. Charging pads and electric toothbrushes require that the device be placed very close to (or directly on top of) the charging pad. This is because the efficiency for traditional inductively coupled wireless power transfer systems drops off rapidly as the distance between the transmitter and receiver increases.

Far-field wireless power transfer techniques use propagating electromagnetic waves and are capable of delivering power to a much larger volume of space. However, there is an inherent tradeoff between directionality and transfer efficiency. For example, radio frequency (RF) broadcast methods—which transmit power in an omni-directional pattern—allow for power transfer anywhere in the coverage area. Although mobility is maintained, end-to-end efficiency is lost because the power density decreases with the square of the distance. Microwave systems with high gain antennas have been used to transfer power over several kilometers at efficiencies of over 90%. However, these systems suffer from the need for sophisticated tracking and alignment equipment to maintain a line of sight (point-to-point) connection.

Regulatory restrictions limit the amount of power that can be transmitted in uncontrolled environments for safety, as well as emissions and interference reasons. As a result, the main commercial use of far-field wireless power transfer is for passive (i.e., battery free) ultrahigh frequency RF identification (UHF RFID) tags, which are limited to four watts equivalent isotropic radiated power in the United States.

Recent research efforts using coupled resonators (MCRs) for wireless power transfer have demonstrated the potential to deliver power with more efficiency than far-field broadcast approaches, and at longer ranges than traditional inductively coupled methods. These techniques use high quality factor ("high-Q") coupled resonators that transfer energy via magnetic fields that do not strongly interact with the human body. U.S. Patent Publication No. 2012/0153738, to Karalis et al., and U.S. Patent Publication No. 2012/0080957, to Cooper et al., both of which are hereby incorporated by reference in their entireties, disclose certain aspects of wireless energy transfer using MCRs.

However, a drawback of current MCR systems is the inability to efficiently adapt to changes in the environment. For example, unpredictable loads and changes in distance and orientation between MCR coils rapidly change system operating points, which disrupt the end-to-end wireless power transfer efficiency. Dynamic adaptation of a system to these types of events is a critical capability in developing fully functional and versatile wireless power solutions.

FIG. 1 shows a diagram of a wireless power system 90 using high-Q MCRs. A transmitter module 91 includes a single turn drive loop 93 and a multi-turn, spiral resonator or transmit coil (Tx coil) 94. When an RF amplifier 92 drives current through the drive loop 93 at the transmitter module's 91 resonant frequency, the resulting oscillating magnetic field excites the Tx coil 94. The Tx coil 94 stores energy in the same manner as a discrete LCR tank. This results in a large oscillating magnetic field in the vicinity of the Tx coil 94. A high-Q coil implies that more energy can be stored on the coil, which also results in greater magnetic flux density at a given point in space.

The receiver module 95 is designed similarly. It includes a multi-turn, spiral resonator or receive coil (Rx coil) 96 and a single turn load loop 97, which is connected to an end device 98. The drive loop 93 and Tx coil 94 are magnetically coupled, and the load loop 97 and Rx coil 96 are magnetically coupled. Similarly, the Tx coil 94 and the Rx coil 96 share a mutual inductance, which is a function of the geometry of the coils 94, 96 and the distance between them. The high-Q Tx and Rx coils 94, 96 form a single system of coupled resonators, which can efficiently transfer energy therebetween.

In general (other parameters being held constant), the coupling coefficient between the Tx coil 94 and the Rx coil 96 is inversely proportional to the distance between the coils 94, 96. At relatively short distances (in the over-coupled regime), high efficiency power transfer between the coils 94, 96 can be achieved. However, in the over-coupled regime there are multiple resonant modes that occur at different frequencies. In order to achieve high efficiency in the over-coupled regime, a wide range of operating frequencies may be used to track the optimal frequency corresponding to one of these resonant modes. As the separation distance increases, the coupling between the resonators 94, 96 decreases, and the frequency range for high efficiency power transfer narrows, until the optimal frequency converges to the fundamental frequency of the system (critical coupling). However, as discussed below, proper tuning techniques will enable near constant power transfer efficiency substantially within the entire over-coupled regime.

In the under-coupled regime, the shared flux falls below a critical point. Below this point, the Tx coil 94 needs to emit more power to maintain the magnetic field than can be absorbed by the Rx coil 96. The result is that maximum efficiency cannot be achieved. Critical coupling is the point of transition between these two regimes and corresponds to the greatest range at which maximum efficiency can still be achieved. The under-coupled regime is still capable of wireless power transfer, but efficiency decreases rapidly as distance increases.

Therefore, for short distances between the Tx coil 94 and the Rx coil 96, i.e., in the over-coupled region, there can be two resonant modes at different frequencies than the resonant frequency of the individual coils. The low frequency mode corresponds to the in-phase mode and the high frequency mode corresponds to the out-of-phase mode. For both modes, the frequency at which the maximum power transfer efficiency occurs varies as the distance between the coils changes. At a sufficiently long range between the coils (the critically coupled region), maximum power transfer occurs at a single frequency: the tuned resonant frequency of the coils. Beyond this distance (the under-coupled region), the wireless power transfer efficiency drops off by one over distance cubed, and the maximum achievable efficiency occurs at this same frequency.

In one embodiment, the system detects these changes and performs auto-tuning from the TX side only. This eliminates the need for an out-of-band (OOB) radio link or backscatter techniques to transmit information from the RX side back to the TX side. A bidirectional coupler may be used to track the forward (a1) and reflected (b1) signals between a power amplifier and the TX coil. By connecting the attenuated outputs from the directional coupler to an RF Gain and Phase Detector (GPD), the reflection S-parameter, S11 (S11=b1/a1), response can be analyzed at either a single frequency or for a range of frequencies. For frequency sweeps, it may be important to ensure that the power amplifier has a sufficiently wide bandwidth so that the output power is consistent at different frequencies.

In other embodiments, signals are measured at the receiver side and sent digitally to the transmitter using either an out-of-band radio link, or an in-band communication technique (e.g., backscatter or load modulation). In other embodiments, the system detects these changes and performs auto-tuning from the receiver side only.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A wireless power transfer system in accordance with an embodiment of the present invention includes a power transmitter having a transmitter controller in signal communication with an amplifier and a transmitter-side impedance matching module, wherein the transmitter-side impedance matching module is configured to transfer power from the amplifier to a transmit resonator. A power receiver is provided having a receiver controller in signal communication with a receiver-side impedance matching module and a rectifier that outputs a rectified voltage. The receiver-side impedance matching module is configured to transfer power from a receive resonator to the rectifier. The transmitter controller is configured to receive feedback from the power receiver indicating a state of the power receiver, and to use the received feedback to adjust a parameter of the power transmitter to produce a target rectified voltage at the rectifier.

In an embodiment, the power receiver does not have a voltage regulator component.

In an embodiment, the power transmitter and power receiver include out-of-band radios in signal communication with their respective controllers, for providing the feedback from the power receiver to the power transmitter.

In an embodiment the feedback received by the transmitter is a value indicating the received power level.

In an embodiment the feedback received by the transmitter includes the rectified voltage output by the receiver rectifier.

In an embodiment the power transmitter includes a sensor that detects a reflection signal in the transmitter that indicates a state of the power receiver, for example, an S-parameter such as the voltage reflection coefficient. For example, the power transmitter may include a direction coupler.

In an embodiment the receiver controller monitors a parameter of the power receiver, and modulates the receiver side impedance matching module to encode the monitored parameter, such that the transmitter controller can decode the encoded parameter to receive the desired feedback, for example, the rectified voltage.

In an embodiment the power transmitter includes a sensor to detect the presence of a body, for example, a human, and the transmitter controller is configured to stop or reduce power transmission if the sensor detects the presence of a body.

In an embodiment the transmitter controller is configured to control the transmitter-side impedance matching module to produce a target rectified voltage from the rectifier.

A wireless power transmitter includes a transmitter controller in signal communication with an amplifier and an impedance matching module, wherein the impedance matching module receives alternating current from the amplifier and energizes a transmit resonator for wireless transmission, wherein the transmitter is configured to transmit radio frequency energy to a receiver having a receive resonator connected to a rectifier configured to produce a rectified voltage; and further wherein the transmitter controller is configured to receive feedback from the receiver indicating the rectified voltage, and to use the received feedback to adjust a parameter of the power transmitter to produce a target rectified voltage at the rectifier.

In an embodiment the power transmitter receives feedback through an out-of-band radio, from a sensor that detects a reflection signal in the transmitter, or from a modulated signal from the receiver.

A method for wireless power transmission includes in a transmitter, generating an alternating current with a power amplifier and using the alternating current to energize a transmit resonator; in a receiver, receiving power from the transmit resonator with a receive resonator that is coupled to the transmit resonator and generating a rectified voltage for a load; providing feedback from the receiver to the transmitter that indicates the rectified voltage; and using the feedback to adjust the transmitter such that the rectified voltage is maintained at a predetermined value.

In an embodiment, a first impedance matching module is provided between the power amplifier and the transmit resonator, and a second impedance matching module is provided between the rectifier and the receive resonator.

In an embodiment, the transmitter further comprises a first radio, and the receiver further comprises a second radio, wherein the feedback from the receiver to the transmitter is communicated between the first and second radios.

In an embodiment, the transmitter further comprises a directional coupler, and the feedback comprises a reflection signal.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 2:
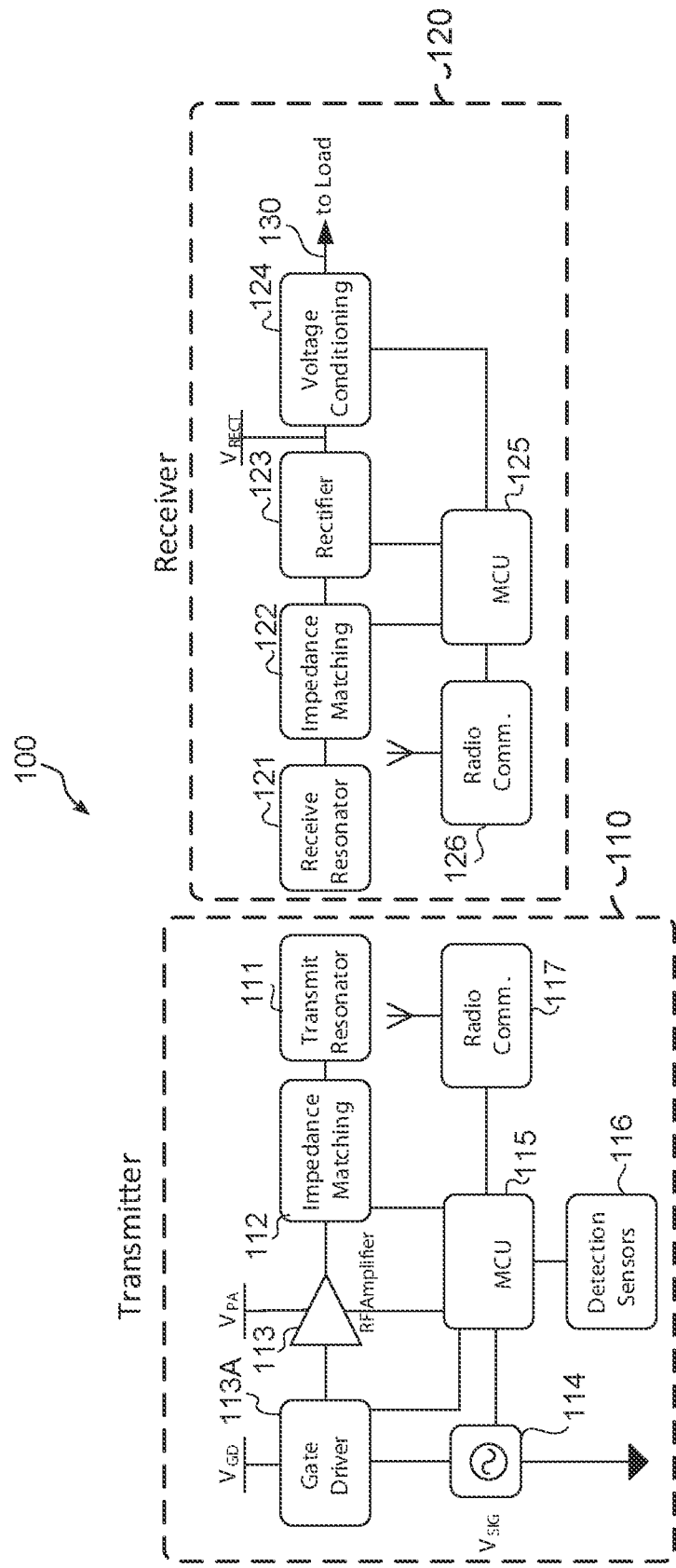
FIG. 2 is a system level diagram of a wireless power system in accordance with the present invention.

A wireless power delivery system 100 in accordance with the present invention is shown schematically in FIG. 2. The system 100 includes a transmitter module 110 and a receiver module 120. The receiver 120 has a rectifier 123 to convert an RF wireless power signal received by the receive resonator 121 into a DC voltage. In a conventional wireless system, the rectified voltage ($V_{RECT}$) may vary over a wide range depending on the load power requirement and the transmit power level. If the transmitter outputs significantly more power than is required by the load device, $V_{RECT}$ will spike, potentially dramatically. If this happens, there are two primary concerns. First, the wireless power system is operating at a very low efficiency since the transmit power level is much greater than the load or output power. Second, the high voltage level on the receiver can damage the more sensitive electronics on the receiver side and potentially destroy the receiver circuit.

To overcome the second concern, conventional wireless power systems will typically use an overvoltage protection circuit, or a zener diode to limit the maximum allowable rectified voltage. However, this does not address the problem of inefficiency. In order to operate efficiently, the rectified voltage should be held just above the required voltage for the load device or battery. However, as the distance between the coil changes, or the load power consumption changes, the rectified voltage will inherently change as well. Therefore, frequently wireless power systems also use a DC-DC converter (or other voltage regulation component) that converts the varying rectified voltage into a fixed voltage suitable for the load device, battery, battery charger (e.g., 5V, 12V, 24V, etc.), etc. However for high power applications, such as charging robots or electric vehicles on the order of 100-1000 Watts, the DC-DC converter may be one of the most expensive and thermally dangerous components on the entire receiver board.

In the wireless power system 100 shown in FIG. 2, the transmitter 110 uses feedback from the receiver 120 to control the power that is transmitted to the receiver 120, for example, to maintain a desired $V_{RECT}$. Therefore, the system 100 does not require a DC-DC converter. Because the transmitter 110 is actively controlled to achieve the desired $V_{RECT}$ at the receiver 120 the rectifier voltage may be supplied directly to the load 130, optionally with minor conditioning 124 (that does not include DC-DC conversion between the rectifier and the load 130).

Exemplary methods that may be used to provide feedback from the receiver 120 to the transmitter 110 include: (i) provide the transmitter 110 and the receiver 120 with out-of-band radio systems 117, 126, respectively, wherein the receiver 120 is configured to transmit relevant information from the receiver 120 (e.g., $V_{RECT}$) to the transmitter 110, for example, using WiFi, ZigBee®, or Bluetooth® protocols; (ii) provide the transmitter 110 with a reflection sensor 116, for example, a directional coupler that directly detects changes in the receiver 120, e.g., through the well-known scattering parameters S, and in particular the input port voltage reflection coefficient S11; and/or (iii) modulate an impedance matching module 122 to encode a signal, e.g., a digital signal, regarding the desired receiver 120 information, without significantly interfering with the desired power transmission from the transmitter 110 to the receiver 120.

The wireless power system 100 includes the power transmitter 110 and the power receiver 120. The transmitter 110 includes a transmit resonator 111 that is coupled to a corresponding receive resonator 121 on the receiver 120 during use. A signal generator 114, and amplifier comprising a gate driver 113A and an RF amplifier 113 drive the transmit resonator 111 through a variable impedance matching module 112. One or more of the present inventors have disclosed suitable variable impedance matching modules 112 in co-pending U.S. patent application Ser. No. 14/402, 660, the disclosure of which is hereby incorporated by reference in its entirety.

A transmitter microcontroller 115 receives feedback from the receiver 120 from one or more detection sensors 116 (e.g., a directional coupler) and/or with an out-of-band radio 117, and uses the feedback to control the transmitter 110 output. In this exemplary embodiment the microcontroller 115 may control the power output from the resonator 111 by adjusting one, or more than one, of the signal generator voltage, $V_{SIG}$, the gate driver voltage, $V_{GD}$, the power amplifier voltage, $V_{PA}$, and the impedance matching module 112.

The receiver 120 in this embodiment includes the receive resonator 121, that is operatively connected to a receiver-side variable impedance matching module 122 compatible with the transmitter variable impedance matching module 112. Received power is provided to a rectifier 123 to produce the desired rectified voltage. $V_{RECT}$ may be applied directly to the load 130, or a voltage conditioning component 124 may optionally be provided. A receiver microcontroller 125 controls the variable impedance matching module 122, which may be based in part on information received from the transmitter 110 through a compatible out-of-band radio 126.

The receiver 120 also transmits information back to the transmitter 110. Typically, the value of $V_{RECT}$ is transmitted, although it is contemplated that other related data may additionally or alternatively be transmitted.

The transmit resonator 111 generates magnetic fields or electromagnetic fields from the electrical signal incoming from the variable impedance matching module 112. The variable impedance matching module 112 enables high power transfer efficiency, even as range, orientation, and/or load vary. The transmitter microcontroller 115 sets a desired state of $V_{SIG}$, $V_{GD}$, $V_{PA}$, and/or the impedance through the impedance matching module 112 to provide optimal power delivery. The signal generator 114 generates the power transfer signal. For example, in some embodiments the power transfer signal may be 13.56 MHz, 6.78 MHz, or a lower frequency signal.

The detection sensors 116 collect information that the microcontroller 115 uses to control various aspects of the power transfer system. In particular, the detection sensors 116 may include a sensor to detect reflections from the power transfer apparatus (e.g., resonator 111, impedance matching module 112, and/or RF amplifier 113). A suitable reflection signal is the voltage reflection coefficient S11 discussed above.

The detection sensors 116 may also or alternatively include sensors to detect proximity of a person. For example, pyroelectric motion sensors, passive infrared sensors, capacitive sensors, radar sensors, cameras, or other sensors may be used for detecting a person or object. It is contemplated that the detection sensors may be used to safely interrupt power transmission. For example, if a proximity sensor detects the near-field presence of a living body, or if an over-temperature condition is detected, the transmitter microcontroller 115 may stop power transmission from the transmitter 110 to the receiver 120.

Based on the data from the detection sensors 116, the microcontroller 115 adjusts one or more transmitter 110 parameters. For example, the microcontroller 115 may adjust the impedance matching module 112 or control the RF transmit power level. In another exemplary embodiment the transmitter microcontroller 115 controls the frequency, amplitude, phase, or other properties of the signal generated by signal generator 114. These signal properties may be adjusted to maximize the power transferred, or to set the power transferred to a desired level. Additionally, or alternatively, the signal properties may be adjusted to disable power transfer, for example, if no receiver is detected, or if safety sensors 116 indicate it is presently unsafe to transfer power, as discussed above.

The receive resonator 121 transduces the AC magnetic or electromagnetic power transfer fields generated by the transmit resonator 111, converting the AC magnetic fields into AC electrical signals that are fed into receiver variable impedance matching module 122. The receive microcontroller 125 generates GPIO (general purpose input/output) control signals to set the state of the variable impedance matching module 122 in order to optimize the power transfer efficiency, for example.

The receiver 120 may use the radio module 126 to transmit information about power, voltage, current, efficiency, temperature or other parameters in the receiver to the transmitter 110, where it is received by the radio module 117.

The information that the microcontroller 115 receives from the radio module 117 is used to control one or more power transmitter 110 settings. The microcontroller 115 may adjust transmit frequency or power settings to maximize power delivered to the battery and load 130, to maximize the efficiency of power transfer to the battery and load 130, and/or to maintain a power level that is requested or required by the receiver 120.

In some embodiments, the transmitter radio 117 and the receiver radio 126 are configured for bidirectional communication. The high level system control algorithm can run entirely in the transmitter microcontroller 115, and sends commands from the transmitter radio module 117 to the receiver radio module 126 that are executed by the receiver microcontroller 125. In this embodiment, the transmitter microcontroller 115 will also receive sensor data transmitted from the receiver radio module 126 to the transmitter radio module 117.

In other embodiments, only uni-directional communication is used, e.g., from the power receiver 120 to the power transmitter 110. For example, sensor data may be sent from the power receiver radio communications module 126 to the power transmitter radio communications module 117, but commands will not be sent from the power transmitter radio module 117 to the power receiver radio module 126. In still other embodiments, the radio modules 117, 126 may be eliminated entirely, for example, to reduce cost, to improve reliability, or in applications in which the radio propagation environment is unfavorable, and control of the transmitter 110 components may be based on reflected signal detection, or information transferred by modulated power signals, as discussed above.

Figure 1:
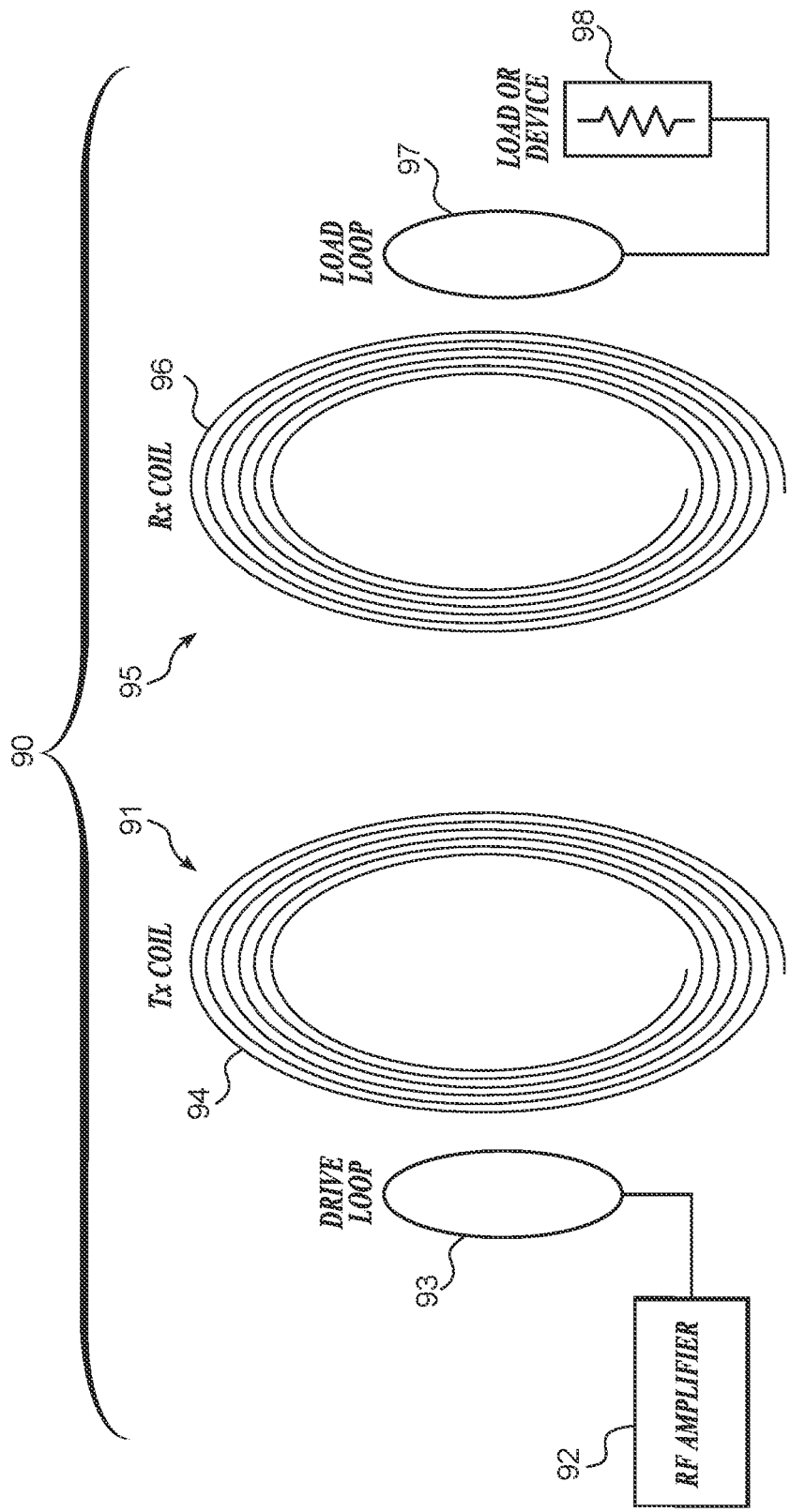
FIG. 1 is a diagram of a wireless power system 90 using magnetically coupled resonators.

It is contemplated that the transmit resonator 111 and the receive resonator 121 may be one-coil or two-coil resonators. The system 90 shown in FIG. 1 uses a four-coil resonator comprising the drive loop 93, the transmit coil 94, the receive coil 96, and the load loop 97. The transmit resonator 111 may include a drive loop and a separate transmit coil, or may comprise a single coil. Similarly, the receive resonator 121 may include a receive coil and a separate load loop, or may comprise a single coil. It is also contemplated in some applications that an intermediate resonator (not shown) may be provided between the transmit resonator 111 and the receive resonator 121.

Figure 3:
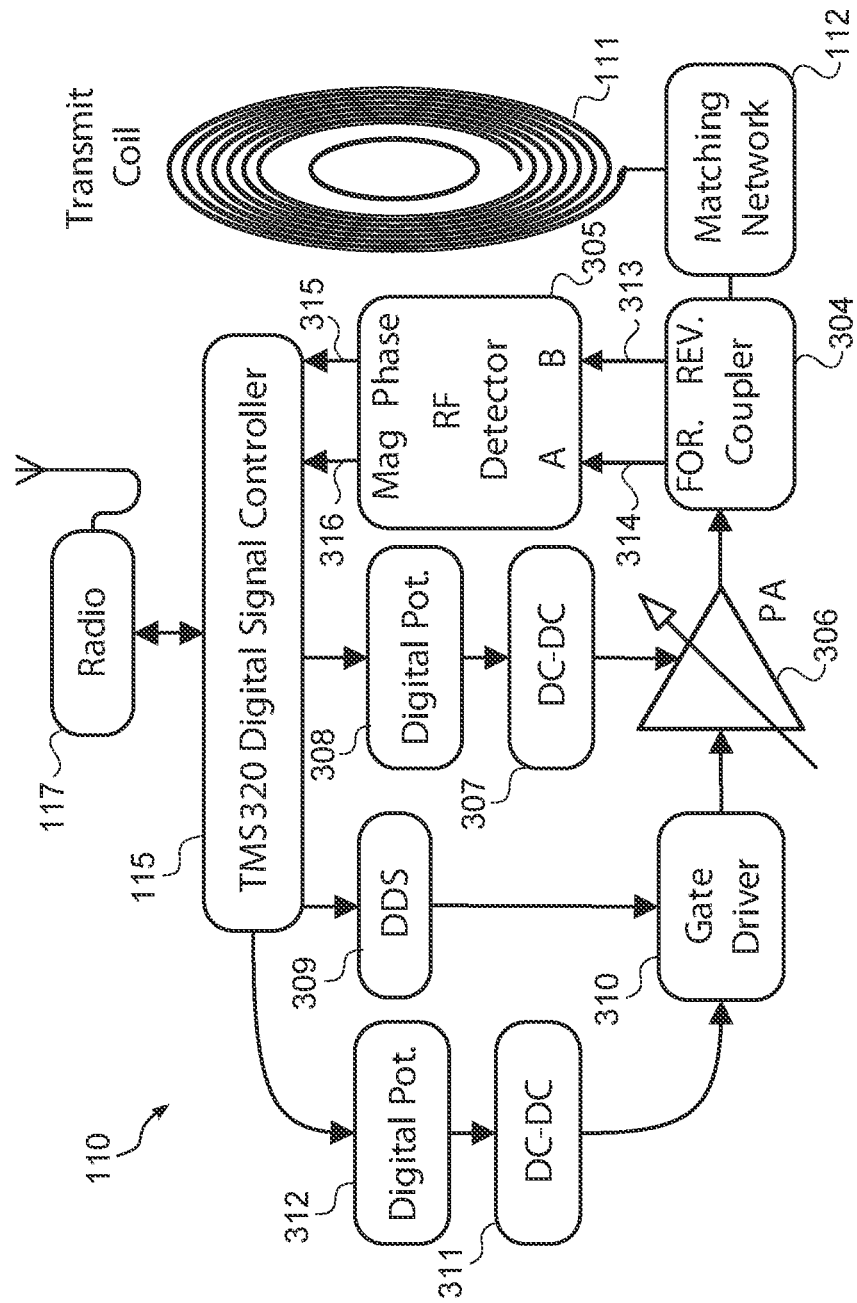
FIG. 3 is a detailed depiction of a power transmitter module suitable for use in the system shown in FIG. 2, that may include a directional coupler.

Refer now to FIG. 3, showing details of an embodiment of the transmitter 110 having a low power radio module 117 with an optional directional coupler 304. In this embodiment, the microcontroller 115 may be, for example, a TMS320 Digital Signal Controller. The microcontroller 115 controls the operations of the power transmitter radio module 117.

The directional coupler 304 is functionally located between a power amplifier 306 and the impedance matching module 112. A relatively high power signal enters the directional coupler 304 from the power amplifier 306 and propagates through to the impedance matching module 112. The directional coupler 304 provides two low power outputs, a forward power output 314, and a sensed reflected (or reverse) power output 313.

When the system is not tuned for high efficiency, relatively large reflections will be generated, causing a relatively large signal out of the sensed reflected power output 313. The ratio of the sensed reflected power output 313 to the sensed forward power output 314 is a measure of how well the system is tuned.

The forward power output 314 and the reverse power output 313 in this exemplary embodiment are fed into an RF detector 305. The RF detector 305 has two outputs, magnitude 316 and phase 315. From forward output 314 and reverse output 313 input signals (both AC signals), the RF detector 305 produces the magnitude 316 of the ratio of the forward signal 314 to the reflected signals 313, as well as a phase difference 315 between the forward and reflected signals 314, 313. Unlike the quickly varying RF inputs, the output magnitude 316 and phase 315 are relatively slowly varying voltages. The magnitude 316 and phase 315 voltages are read by an analog to digital converter built in to the microcontroller 115. The combination of the directional coupler 304 and the RF detector 305 is one exemplary embodiment of the detection sensors 116.

The transmitter microcontroller 115 may control the output power level in one or more of several different ways. For example, the microcontroller 115 may provide digital commands to a digital potentiometer 308, causing a DC-DC converter 307 to change its output DC voltage, which is the power supply voltage for the power amplifier 306. Alternatively, the microcontroller 115 may change the signal level using another digital potentiometer 312 to control the voltage generated by a DC-DC converter 311, which is the power supply of a gate driver 310, thus changing the input voltage to the power amplifier 306. The microcontroller 115 may also, or alternatively, be configured to change the amplitude, frequency, phase or other parameters of the original input signal generated by a direct digital synthesizer (DDS) 309, and provide the changed signal to the gate driver 310.

The various methods of adjusting the power output (e.g., adjusting the power supply of the power amplifier 306, adjusting the power supply of the gate driver 310, adjusting the original input signal produced by a DDS 309) have different advantages depending upon the particular application. For example, one method may be more efficient for certain signal levels, and another may provide more or less resolution. Persons of skill in the art will appreciate the trade-offs among the various ways of controlling system output power.

Figure 4:
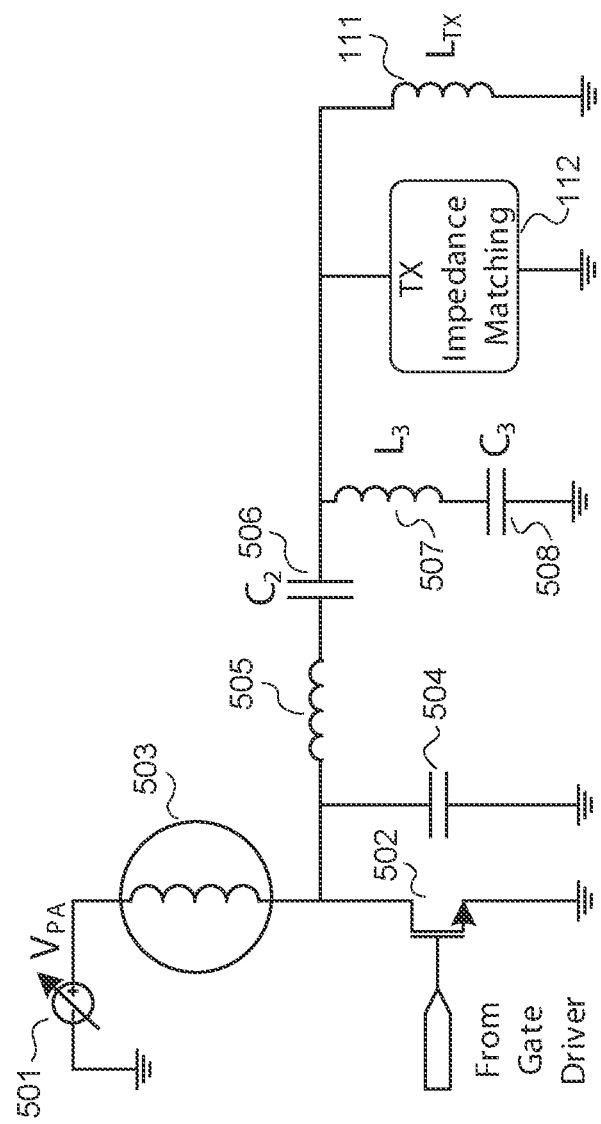
FIG. 4 is a detailed schematic of a Class E power amplifier suitable for use in the system shown in FIG. 2.

Refer now to FIG. 4, showing a detailed schematic of a Class E power amplifier suitable for use in the power transmitter 110. This Class E amplifier circuit takes a relatively low power input square wave and generates a high power sine wave output. A variable DC power supply 501 is shown, that may optionally be implemented using the DC-DC converter 307 and digital potentiometer 308 shown in FIG. 3. Switch 502 is a metal-oxide-semiconductor field-effect transistor (MOSFET) that accepts a control signal from a gate driver, which in one embodiment is a square wave alternating between 0V and 7V. DC current is stored in the inductor component 503. When the switch 502 is off (e.g., the input square wave is low), current flows towards the output through inductor 505. When the switch 502 is on (e.g., the input square wave is high), current flows through the switch 502 to ground. To ensure that minimal power is dissipated across the switch 502 when it is closed, inductor components 503 and capacitor 504 are sized to ensure that the voltage during this time is zero at the drain of switch 502. This network is commonly referred to as a zero-voltage switching network. The components 503 504 also help reduce deviations from the ideal square wave, reducing ringing and other artifacts. The inductor 505 and the capacitor 506 are a resonant (tuned) circuit in series with the signal, tuned to the frequency of the input square wave. The components 505 and 506 pass the square wave's fundamental frequency, helping convert the drain waveform into a smooth sine wave desired for output. Inductor 507 and capacitor 508 form a resonant circuit in a shunt or "trap" configuration. They are tuned to twice the target frequency. Any frequency components at or above twice the fundamental frequency that pass through the inductor 505 and the capacitor 506 will be shunted to ground by components 507 and 508.

Figure 5:
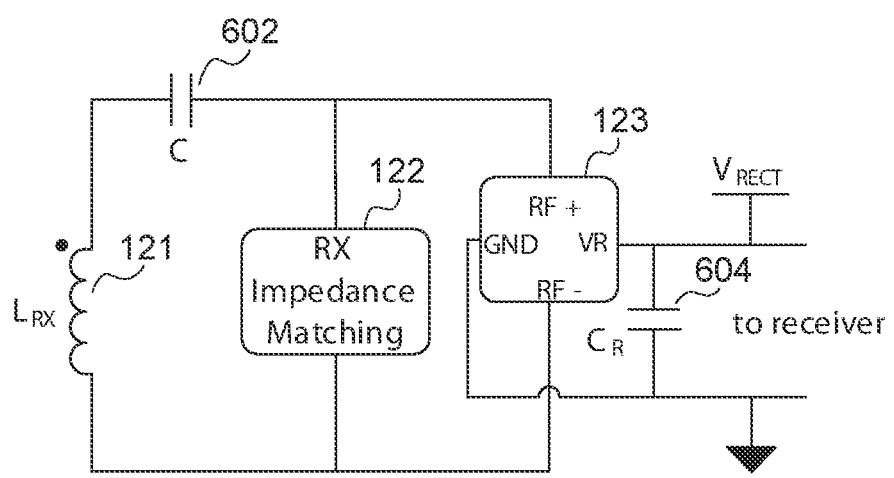
FIG. 5 is a schematic of a power receiver module suitable for use in the system shown in FIG. 2.

FIG. 5 is a schematic of an exemplary power receiver 120. The rectifier 123 may be any suitable rectifier circuit as are well known in the art, including, for example, a simple diode bridge. In one embodiment the rectifier 123 comprises MOSFETs driven synchronously with the RF power signal (an alternative method of full wave rectification). In another embodiment the rectifier 123 is a single diode for half wave rectification.

The receive resonator 121 may be a single loop of wire or several turns of wire, configured to receive magnetic flux from the transmit resonator 111. A receiver capacitor component 602 is selected to tune to the transmitter's fundamental frequency for the resonator 121 and capacitor 602.

The rectifier 123, which converts the incoming AC (or RF) signal into a DC signal, with some ripples. Filtering capacitor 604 reduces the output ripple by shunting high frequency components to ground.

Figure 6:
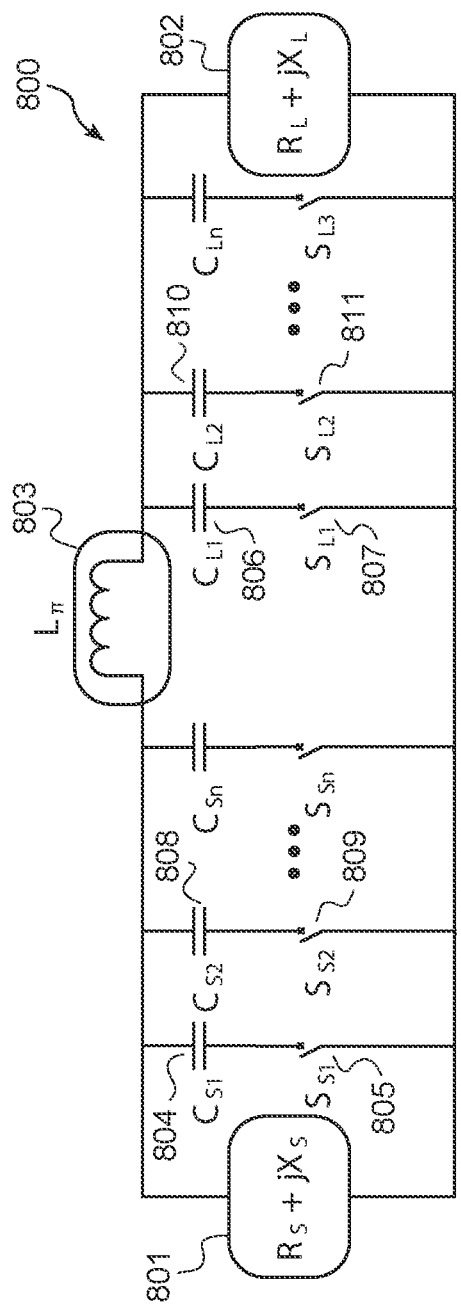
FIG. 6 is a schematic of a variable impedance matching module suitable for use in the system shown in FIG. 2.

FIG. 6 illustrates a variable impedance matching module 800 connecting a source impedance 801 with a load impedance 802. Matching the load impedance 802 with the source impedance 801 maximizes the power delivered to the load. However, other impedance settings may be selected depending on the application. The impedance matching module 800 between 801 and 802 is known as a pi-match topology. It comprises a shunt capacitor 804, 808 followed by a series inductor 803, followed by a shunt capacitor 806, 810.

The capacitances on the source side of the inductor 803 and the capacitances on the load side of the inductor 803 are broken into a plurality of sub-capacitances arranged in series.

The capacitor 804 is one of the sub-capacitances on the source side of the inductor 803. The capacitor 806 is one of the sub-capacitances on the load side of the inductor 803. Each of the sub-capacitances is in series with an electrically (or mechanically) actuated switch, such as 805, 809 on the source side or 807, 811 on the load side. When the switch 805 is closed, the corresponding capacitor 804 contributes to the capacitance on the source side of the pi-match network 800, for example. If the switch 809 is closed, then the capacitor 808 adds in parallel with the capacitor 804. By setting the switches on the source side and the load side, the capacitances on each two branch of the pi-match network 800 can be varied in accordance with the requirements of the application.

Figure 7:
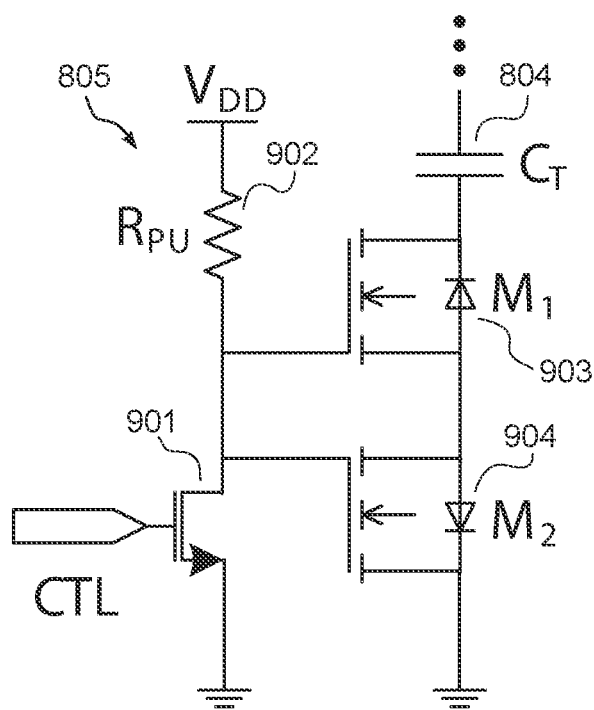
FIG. 7 is a schematic of a switch circuit suitable for use in the transmitter-side adaptive impedance matching module of the system shown in FIG. 2.

FIG. 7 shows a switch circuit suitable for use in the transmit side adaptive impedance matching module 112. For example, the circuit could be used to implement the switch 805. This same switch design could be used for any of the transmit side switches: 805, 809, 807, or 811.

A control signal is applied to the gate of control MOSFET 901. When the switch is open, the gates of MOSFET 903 and MOSFET 904 are pulled high to $V_{DD}$ through pull-up resistor 902. This design allows a lower voltage control signal (less than $V_{DD}$) to generate a higher voltage signal better suited to actuating power MOSFETs 903 and 904. When closed, MOSFETs 903 and 904 must provide a low impedance path between capacitor 804 and ground. When open, MOSFETs 903 and 904 must present a high impedance between capacitor 804 and ground. Due to their structure, power MOSFETs have a so-called intrinsic body diode. Because of the intrinsic body diode, the power MOSFET behaves not as an ideal switch, but as a switch in parallel with a diode. The orientation of the body diode is determined by the orientation of the drain and source of the MOSFET.

The body diode allows conduction when the body diode is forward biased, even if the gate voltage was set in a fashion that ideally would cause the switch to be open (ideally would cause a high impedance between the source and drain). MOSFETs 903 and 904 are identical but are oriented such that their body diodes are oriented opposite one another. This way it is never the case that both body diodes are forward biased. The back-to-back MOSFET configuration allows a high impedance state to be generated that persists throughout both the positive and negative phases of the AC signal that feeds through capacitor 804.

Figure 8:
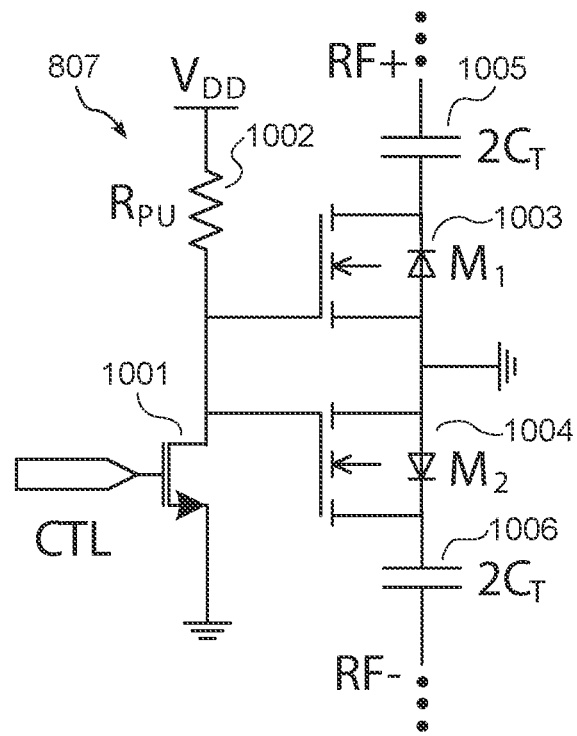
FIG. 8 is a schematic of a switch circuit suitable for use in the receiver-side adaptive impedance matching module of the system shown in FIG. 2.

FIG. 8 shows a switch circuit suitable for use in the receiver-side adaptive impedance matching module 122. Because the induced AC signal on the receiver side fluctuates both positively and negatively with respect to the control signals, a different, more symmetrical design is needed on the receiver side. The MOSFET control switch 1001 and the pull-up resistor 1002 function in the same way as the MOSFET control switch 901 and the pull-up resistor 902 on the transmit side. The node between MOSFETs 1003 and 1004 is grounded. The MOSFET 1003 is connected to the capacitor 1005, which then connects to RF+ (one side of the receive coil). The MOSFET 1004 is connected to the capacitor 1006 and then to RF− (the other side of the receive coil). When the MOSFETs 1003 and 1004 are both closed, the capacitors 1005 and 1006 are effectively connected in series. If the value of the capacitor 1005 is 2 C and the value of the capacitor 1006 is also 2 C, then a net effective capacitance of C is produced when the MOSFETs 1003 and 1004 are both closed, because the capacitors 1005 and 1006 are connected in series. When the MOSFETs 1003 and 1004 are both commanded to be open, at least one will be in a high impedance state, because at most one of their body diodes will be forward biased simultaneously.

Figure 9:
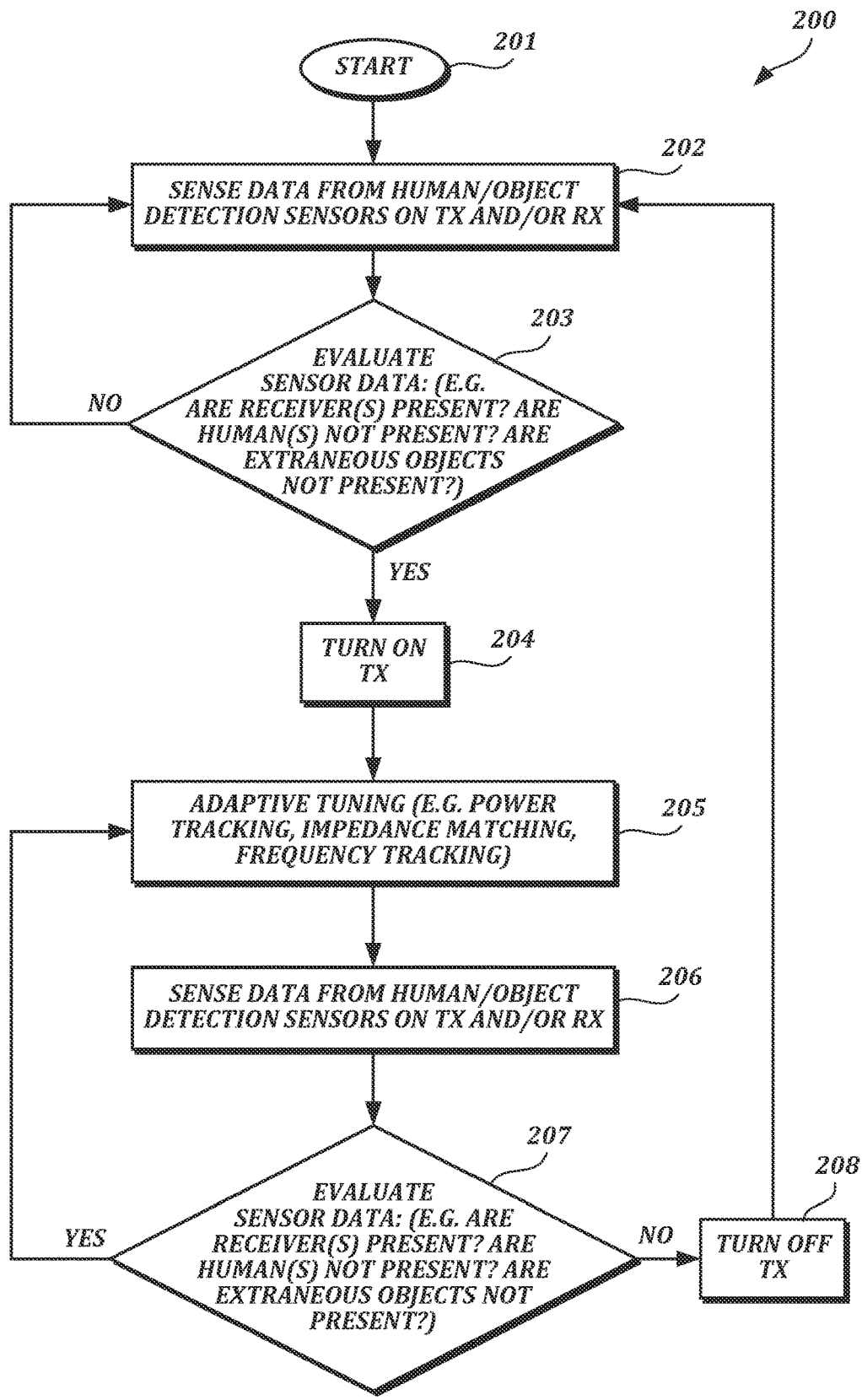
FIG. 9 is a flow chart of a high-level operation of the system shown in FIG. 2.

FIG. 9 is a flow chart showing an exemplary integrate control loop 200 that would run across both the transmitter 110 and the receiver 120. In the initial Start state 201, the transmitter 110 is off. Data from sensors 116 or sensors in the receiver 120 (not shown) is collected 202, to determine if a body, for example, a person, is in close proximity to the transmitter 110. Optionally, the sensors may also, or alternatively, determine if a body is in close proximity to the receiver 120. The control loop also monitors to determine if the receiver 120 is in reasonably close proximity to the transmitter 110. If no persons are detected, and the receiver 120 is near 203 then the transmitter 110 is energized 204. The adaptive tuning 205 is initiated, for example, using power tracking, frequency tracking, or impedance matching, using feedback from the receiver 120 to control the transmitter 110, for example, to achieve a desired $V_{RECT}$ or other receiver parameter, as discussed above. The system tuning algorithm is operable to tune the system 100 for a desired operating point. During operation as the transmitter 110 is providing power to the receiver 120, the sensors 116 continue to monitor the operating conditions and the transmitter microcontroller 115 adjusts one of, or more than one of, the power, impedance, and frequency. The system 100 monitors for the "human absent" condition and the "receiver present" condition 206, which both must be positive to continue transmitting. If a person (or animal) enters to close proximity, or if the receiver 120 (which may be, for example, disposed in a robot) is no longer within range 207, then the power transmission is turned off 208. The system may automatically resume transmission when a person is no longer detected, or when the receiver 120 and transmitter 110 are back within a desired range for power transfer.

Figure 10:
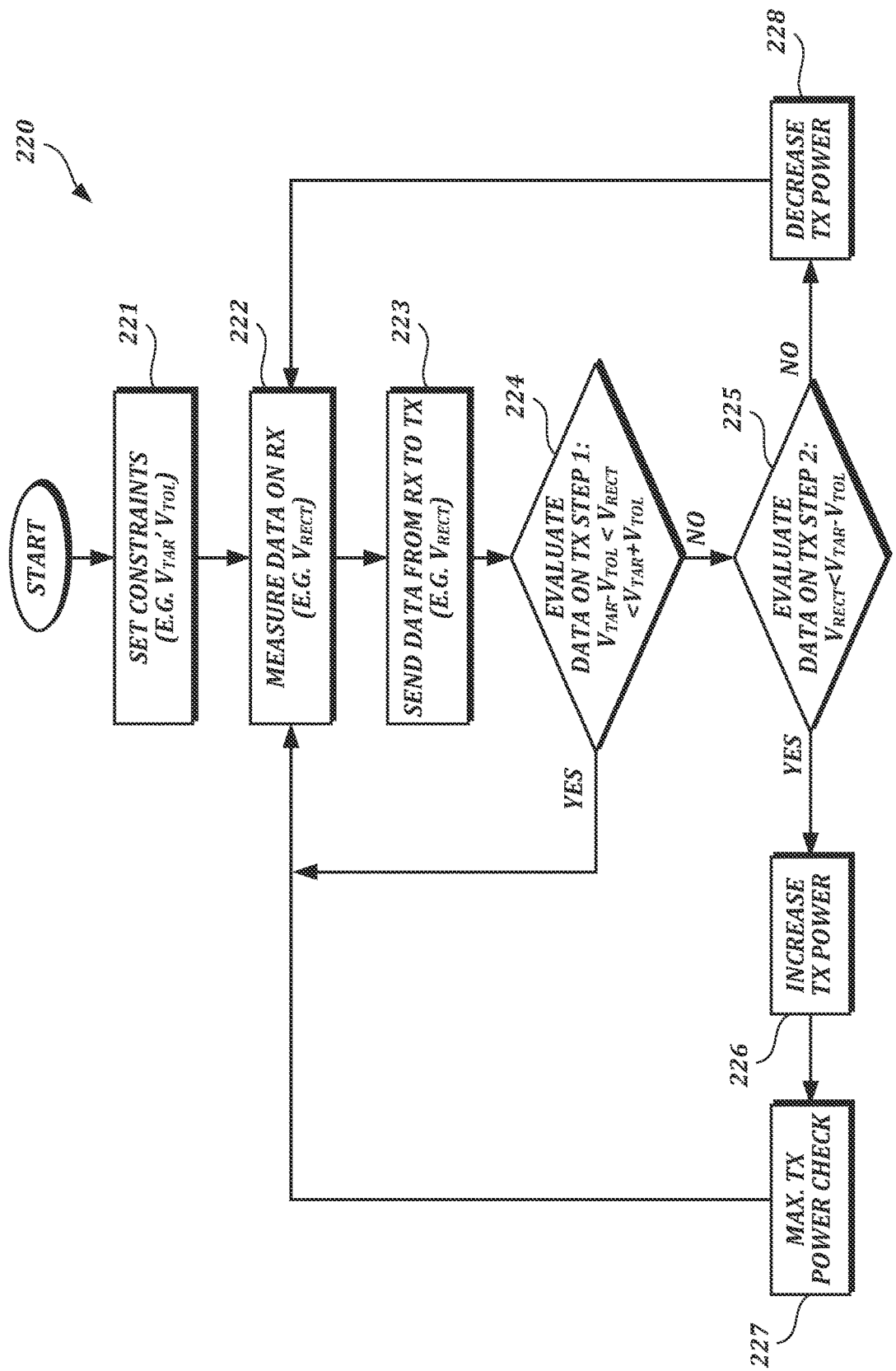
FIG. 10 is a flow chart showing a power control loop that is distributed across the transmitter and receiver, and enables elimination of a receiver-side voltage regulation component.

An exemplary power tracking control method 220 is illustrated in FIG. 10, which runs across both the transmitter 110 and the receiver 120. As discussed above, the transmitter 110 adjusts one or more characteristic of the transmitted power based on a feedback signal from the receiver 120, which allows for a simpler and/or lower cost receiver, for example, by eliminating the need for a DC-to-DC converter between the rectified power output and the load. In prior art systems, a separate receiver-only power control loop is generally required.

Initially, constraint values are set 221, for example, voltage target, $V_{TAR}$, and voltage tolerance, $V_{TOL}$. The receiver 120 monitors a receiver parameter 222, typically $V_{RECT}$. The monitored parameter is feedback 223 from the receiver 120 to the transmitter 110. As discussed above, the feedback 223 may be accomplished in any of a variety of ways, for example, using out-of-band radios, using detected reflection parameters at the transmitter 110, or by encoding the data by modulating one of the impedance matching or the load in the power receiver, which modulation can be detected by the transmitter through the coupled resonators 111, 121. The transmitter 110 interprets the feedback signals 224. In a current embodiment, if $V_{RECT}$ is within $V_{TOL}$ of $V_{TAR}$ (i.e., if $V_{TAR}-V_{TOL}<V_{RECT}<V_{TAR}+V_{TOL}$) then no change is required, and the receiver 222 continues to monitor the receiver parameter 222. If $V_{RECT}$ is not within $V_{TOL}$ of $V_{TAR}$, then the direction of the variance is determined 225, e.g., by testing if $V_{RECT}<V_{TAR}-V_{TOL}$. In this exemplary embodiment, if $V_{RECT}$ is less than $V_{TAR}-V_{TOL}$, then the transmitter 110 power is increased 226 up to a maximum setting 227, otherwise (i.e., if $V_{RECT}$ is greater than $V_{TAR}+V_{TOL}$), an then the transmitter 110 power is decreased 227.

While illustrative embodiments have been illustrated and described, it will be appreciated that various changes can be made therein without departing from the spirit and scope of the invention.

The embodiments of the invention in which an exclusive property or privilege is claimed are defined as follows:

1. A wireless power transfer system comprising:
   a power transmitter comprising a transmitter controller in signal communication with a power amplifier and a transmitter-side impedance matching module, wherein the transmitter-side impedance matching module is configured to transfer power from the power amplifier to a transmit resonator; and
   a power receiver comprising a receiver controller in signal communication with a receiver-side impedance matching module and a rectifier that outputs a rectified voltage, wherein the receiver-side impedance matching module is configured to transfer power from a receive resonator to the rectifier;
   wherein the transmitter controller is configured to receive feedback from the power receiver indicating a state of the power receiver, and to use the received feedback to adjust a parameter of the power transmitter to produce a target rectified voltage at the rectifier,
   wherein the power transmitter further comprises:
   a detection sensor that detects a reflection signal in the transmitter, wherein the detection sensor comprises a directional coupler and a radio frequency (RF) detector, wherein the RF detector is configured for determining a magnitude of a ratio of a forward signal to a reflected signal and a phase of the reflection signal in the transmitter, wherein the reflection signal indicates the state of the power receiver, and wherein both the magnitude and the phase of the reflection signal of the RF detector are fed to the transmitter controller, a digital potentiometer configured for receiving a digital command from the transmitter controller, and a DC-DC converter configured for receiving an input from the digital potentiometer and, in response to the input from the digital potentiometer, configured to change a power supply voltage provided to the power amplifier.

2. The wireless power transfer system of claim 1, wherein the power receiver does not have a voltage regulator component.

3. The wireless power transfer system of claim 1, wherein the power transmitter further comprises a first radio in signal communication with the transmitter controller and the power receiver further comprises a second radio in signal communication with the receiver controller, wherein the feedback received by the transmitter from the receiver is transmitted from the second radio to the first radio.

4. The wireless power transfer system of claim 3, wherein the feedback received by the transmitter comprises the rectified voltage.

5. The wireless power transfer system of claim 1, wherein the reflection signal comprises a voltage reflection coefficient, S11.

6. The wireless power transfer system of claim 5, wherein the directional coupler detects the voltage reflection coefficient, S11.

7. The wireless power transfer system of claim 1, wherein the receiver controller is configured to monitor a parameter of the power receiver and to modulate the receiver-side impedance matching module to encode the monitored parameter, and further wherein the transmitter controller is configured to monitor a signal generated by the modulation of the receiver-side impedance matching module and to decode the encoded parameter, wherein the encoded parameter comprises the received feedback.

8. The wireless power transfer system of claim 7, wherein the monitored parameter is the rectified voltage.

9. The wireless power transfer system of claim 1, wherein the power transmitter further comprises a sensor to detect a human presence, the sensor being in signal communication with the transmitter controller, and wherein the transmitter controller is configured to stop or reduce power transmission in response to a signal from the sensor.

10. The wireless power transfer system of claim 1, wherein the transmitter controller is configured to control the transmitter-side impedance matching module to produce the target rectifier voltage from the rectifier.

11. A method of wireless power transmission comprising:

in a transmitter, generating an alternating current with a power amplifier, and using the alternating current to energize a transmit resonator;

in a receiver, receiving power from the transmit resonator with a receive resonator that is coupled to the transmit resonator, and generating a rectified voltage for a load;

providing feedback from the receiver to the transmitter that indicates the rectified voltage; and using the feedback to adjust the transmitter such that the rectified voltage is maintained at a predetermined value, wherein the transmitter further comprises:

a detection sensor, the detection sensor comprising a directional coupler that directly detects changes in the receiver and a radio frequency (RF) detector, wherein the RF detector is configured for determining a magnitude of a ratio of a forward signal to a reflected signal and a phase of a reflection signal in the transmitter, the feedback comprises the reflection signal detected by said detection sensor, and wherein both the magnitude and the phase of the reflection signal of the RF detector are fed to the transmitter controller, a digital potentiometer configured for receiving a digital command from the transmitter controller, and a DC-DC converter configured for receiving an input from the digital potentiometer and, in response to the input from the digital potentiometer, configured to change a power supply voltage provided to the power amplifier.

12. The method of claim 11, further comprising providing a first impedance matching module between the power amplifier and the transmit resonator, and a second impedance matching module between the rectifier and the receive resonator.

13. The method of claim 11, wherein the transmitter further comprises a first radio, and the receiver further comprises a second radio, wherein the feedback from the receiver to the transmitter is communicated between the first and second radios.

* * * * *